United States Patent
Chen

(10) Patent No.: US 9,019,185 B2
(45) Date of Patent: Apr. 28, 2015

(54) METHOD, DEVICE AND LIQUID CRYSTAL DISPLAY FOR REDUCING CROSSTALK OF SHUTTER-TYPE 3D LIQUID CRYSTAL DISPLAYS

(75) Inventor: Yu-Yeh Chen, Guandong (CN)

(73) Assignee: Shenzhen China Star Optoelectronics Technology Co., Ltd, Shenzhen, Guangdong ( * ) Notice: Subject to any disclaimer, the term of this patent is extended or adjusted under 35 U.S.C. 154(b) by 185 days.

(21) Appl. No.: 13/643,085

(22) PCT Filed: Sep. 4, 2012

(86) PCT No.: PCT/CN2012/080970
§ 371 (c)(1),
(2), (4) Date: Oct. 24, 2012

(87) PCT Pub. No.: WO2014/026415
PCT Pub. Date: Feb. 20, 2014

(65) Prior Publication Data
US 2014/0049567 A1   Feb. 20, 2014

(30) Foreign Application Priority Data

Aug. 17, 2012   (CN) .......................... 2012 1 0295623

(51) Int. Cl.
G09G 3/36 (2006.01)
G09G 3/00 (2006.01)
H04N 13/00 (2006.01)
H04N 13/04 (2006.01)

(52) U.S. Cl.
CPC .................. *G09G 3/36* (2013.01); *G09G 3/003* (2013.01); *G09G 3/3611* (2013.01); *G09G 2320/0209* (2013.01); *G09G 2360/16* (2013.01); *H04N 13/0007* (2013.01); *H04N 13/0438* (2013.01); *H04N 2013/0074* (2013.01)

(58) Field of Classification Search
CPC ..................... G09G 3/2077; G09G 2320/0271
USPC .................................................... 345/690, 89
See application file for complete search history.

(56) References Cited

U.S. PATENT DOCUMENTS

| | | | |
|---|---|---|---|
| 2011/0037829 A1* | 2/2011 | Hata | 348/43 |
| 2011/0090321 A1* | 4/2011 | Nakagawa et al. | 348/51 |
| 2012/0007895 A1* | 1/2012 | Kim et al. | 345/690 |
| 2012/0147138 A1* | 6/2012 | Yu | 348/43 |
| 2013/0076873 A1* | 3/2013 | Oshikiri | 348/51 |

* cited by examiner

Primary Examiner — Long D Pham
(74) Attorney, Agent, or Firm — Andrew C. Cheng

(57) ABSTRACT

A method for reducing crosstalk of a liquid crystal display is disclosed. The method includes receiving digital information of an original left eye image and an original right eye image, determining if the gray level values of the pixels in each scanning lines of the left eye image is the same with that of a corresponding pixel in the right eye image, adjusting the gray level values of the pixels to be a first target gray level value of a first gray level table when the comparing result is the same, adjusting the gray level values of the pixels to be a second target gray level value combination of a second gray level table when the comparing result is not the same, and transmitting the digital information of the sorted left eye image and the right eye image after the adjusting steps are executed.

16 Claims, 8 Drawing Sheets

| | original gray level values | first target gray level values |
|---|---|---|
| left eye/right eye | 255/255 | 249/249 |
| left eye/right eye | 254/254 | 247/247 |
| left eye/right eye | 253/253 | 244/244 |
| ... | ... | ... |
| left eye/right eye | 0/0 | 30/30 |

| | original gray level values | second target gray level value combination |
|---|---|---|
| left eye/right eye | 255/0 | 249/20 |
| left eye/right eye | 255/1 | 249/22 |
| left eye/right eye | 255/2 | 248/25 |
| ... | ... | ... |
| left eye/right eye | 255/254 | 249/247 |
| left eye/right eye | 254/0 | 247/21 |
| left eye/right eye | 254/1 | 247/23 |
| left eye/right eye | 254/2 | 247/25 |
| ... | ... | ... |
| left eye/right eye | 254/253 | 247/245 |
| left eye/right eye | 253/0 | 242/22 |
| left eye/right eye | 253/1 | 242/25 |
| left eye/right eye | 253/2 | 242/29 |
| ... | ... | ... |
| left eye/right eye | 253/252 | 242/238 |
| left eye/right eye | 252/0 | 238/25 |
| ... | ... | ... |
| left eye/right eye | 3/0 | 34/29 |
| left eye/right eye | 3/1 | 34/30 |
| left eye/right eye | 3/2 | 34/33 |
| left eye/right eye | 2/0 | 31/28 |
| left eye/right eye | 2/1 | 31/30 |
| left eye/right eye | 1/0 | 30/28 |

Figure 5

METHOD, DEVICE AND LIQUID CRYSTAL DISPLAY FOR REDUCING CROSSTALK OF SHUTTER-TYPE 3D LIQUID CRYSTAL DISPLAYS

This application claims priority to China Patent Application No. 201210295623.7 filed on Aug. 17, 2012 entitled, METHOD, DEVICE AND LIQUID CRYSTAL DISPLAY FOR REDUCING CROSSTALK OF SHUTTER-TYPE 3D LIQUID CRYSTAL DISPLAYS, all of the disclosures of which are incorporated herein by reference in their entirety.

BACKGROUND OF THE INVENTION

1. Field of the Invention

Embodiments of the present disclosure relate to 3D liquid crystal displays technology, and more particularly to a method, a device and a liquid crystal display for reducing crosstalk of shutter-type 3D liquid crystal displays.

2. Discussion of the Related Art

The operating mechanism of shutter-type 3D liquid crystal displays is to display images for a left eye and a right eye in turn. The shutter glasses are then controlled to be closed so that the left eye and the right eye may see the respective left eye image and the right eye. The crosstalk appears while the left eye sees the right eye image and the right eye sees the left eye image.

As the liquid crystal is a hold-type display with a certain response time, when the liquid crystal display is displaying a current frame, the previous frame is hold until the certain response time ends. The crosstalk happens when the liquid crystal display is not capable of distinguishing from the left eye image and the right eye image.

In order to reduce the crosstalk, the time period of frame transmission is compressed or the backlight scanning method is adopted to enhance a dynamical response.

However, the backlight scanning method is not good enough, and the cost is high. On the other hand, the method of compressing the time period of frame transmission is limited by the compression ratio. Therefore, there is a need to reduce the crosstalk of shutter-type 3D liquid crystal displays.

SUMMARY

The object of the claimed invention is to provide a method, device and liquid crystal display for reducing crosstalk of shutter-type 3D liquid crystal displays.

In one aspect, a method for reducing crosstalk of a liquid crystal display includes receiving digital information of an original left eye image and an original right eye image; determining if the gray level values of the pixels in each scanning lines of the left eye image is the same with that of a corresponding pixel in the right eye image; a first adjusting step for adjusting the gray level values of the pixels to be a first target gray level value of a first gray level table when the comparing result is the same; a second adjusting step for adjusting the gray level values of the pixels to be a second target gray level value combination of a second gray level table when the comparing result is not the same; and transmitting the digital information of the sorted left eye image and the right eye image after the adjusting steps are executed for the pixels in all of the scanning lines.

Wherein the first gray level table of each scanning lines are pre-defined, and each of the original gray level values corresponds to one first target gray level values.

Wherein the second gray level table of each scanning lines are pre-defined, each of the original gray levels value corresponds to one second target gray level value combinations, and the second target gray level value combination includes the second target gray level value for the left eye image and the second target gray level value for the right eye image.

Wherein the transmitting step further includes buffering one of the left eye image or the right eye image after the image is adjusted, sorting the buffered image and the other adjusted image, and transmitting the sorted left eye image and the right eye image.

Wherein the first adjusting step further includes searching the pre-defined first gray level table corresponding to the pixels and identifying the first target gray level value of the pixels; and adjusting the gray level values of the pixels to be the first target gray level values.

Wherein the second adjusting step further includes searching the pre-defined second gray level table corresponding to the pixels and identifying the second target gray level value combination of the pixels; and adjusting the gray level values of the pixels to be the second target gray level values of the second target gray level value combination, and the second target gray level value combination includes the second target gray level value for the left eye and the second target gray level value for the right eye.

Wherein the first gray level table and the second gray level table satisfy the relationships below: a maximum brightness is obtained from a brightness of the left eye after overlapping the left eye and the right eye when the gray level combination for the left eye and the right eye is 255/0; a minimum brightness is obtained from a brightness of the left eye after overlapping the left eye and the right eye when the gray level combination for the left eye and the right eye is 0/255, and the maximum brightness corresponds to the gray level value equal to 255; the minimum brightness corresponds to the gray level value equal to 0 so as to form a three dimensional gray level gamma curve; the difference between the brightness of the second target gray level value of the second gray level table of the pixel after overlapping the left eye and the right eye and the brightness of the corresponding pixel on the three dimensional gray level gamma curve is within three percents; and the difference between the brightness of the first target gray level value of the first gray level table of the pixel after overlapping the left eye and the right eye and the brightness of the corresponding pixel on the three dimensional gray level gamma curve is within three percents.

In another aspect, a device for reducing crosstalk of a liquid crystal display includes a receiving unit, a comparing unit, a first adjusting unit, a second adjusting unit, and a sending unit. The receiving unit is for receiving digital information of an original left eye image and an original right eye image. The comparing unit is for determining if the gray level values of the pixels in each scanning lines of the left eye image are the same with that of a corresponding pixel in the right eye image. The first adjusting unit is for adjusting the gray level values of the pixels to be a first target gray level value of a first gray level table when the comparing result is the same. The second adjusting unit is for adjusting the gray level values of the pixels to be a second target gray level value combination of a second gray level table when the comparing result is not the same. The sending unit is for transmitting the digital information of the sorted left eye image and the right eye image after the adjusting steps are executed for the pixels in all of the scanning lines.

Wherein the device further includes a storage unit for storing the corresponding first gray level tables and the second gray level tables of each scanning lines, wherein each original gray level values corresponds to the first target gray level value in the first gray level table, each original gray level combinations corresponds to one second target gray level value combination in the second gray level table, and the second target gray level value combination includes second target gray level values for the left eye and a second target gray level value for the right eye.

Wherein the device further includes a temporary storage for buffering one of the left eye image or the right eye image after the image is adjusted, sorting the buffered image and the other adjusted image, and transmitting the sorted left eye image and the right eye image.

Wherein the first adjusting unit further includes a first target determination sub-unit for searching the pre-defined first gray level table corresponding to the pixels and identifying the first target gray level value of the pixels; and a first target determination sub-unit for adjusting the gray level values of the pixels to be the first target gray level values.

Wherein the second adjusting unit further includes a second target determination sub-unit for searching the pre-defined second gray level table corresponding to the pixels and identifying the second target gray level value combination of the pixels; and a second adjusting sub-unit for adjusting the gray level values of the pixels to be the second target gray level values of the second target gray level value combination, and the second target gray level value combination includes the second target gray level value for the left eye and the second target gray level value for the right eye.

Wherein the first gray level table and the second gray level table satisfy the relationships below: a maximum brightness is obtained from a brightness of the left eye after overlapping the left eye and the right eye when the gray level combination for the left eye and the right eye is 255/0; a minimum brightness is obtained from a brightness of the left eye after overlapping the left eye and the right eye when the gray level combination for the left eye and the right eye is 0/255, and the maximum brightness corresponds to the gray level value equal to 255; the minimum brightness corresponds to the gray level value equal to 0 so as to form a three dimensional gray level gamma curve; the difference between the brightness of the second target gray level value of the second gray level table of the pixel after overlapping the left eye and the right eye and the brightness of the corresponding pixel on the three dimensional gray level gamma curve is within three percents; and the difference between the brightness of the first target gray level value of the first gray level table of the pixel after overlapping the left eye and the right eye and the brightness of the corresponding pixel on the three dimensional gray level gamma curve is within three percents.

In another aspect, a liquid crystal display includes a device for reducing crosstalk. The device includes a receiving unit for receiving digital information of an original left eye image and an original right eye image, a comparing unit for determining if the gray level values of the pixels in each scanning lines of the left eye image is the same with that of a corresponding pixel in the right eye image, a first adjusting unit for adjusting the gray level values of the pixels to be a first target gray level value of a first gray level table when the comparing result is the same, a second adjusting unit for adjusting the gray level values of the pixels to be a second target gray level value combination of a second gray level table when the comparing result is not the same, and a sending unit for transmitting the digital information of the sorted left eye image and the right eye image after the adjusting steps are executed for the pixels in all of the scanning lines.

Wherein the device further includes a storage unit for storing the corresponding first gray level tables and the second gray level tables of each scanning lines, wherein each original gray level values corresponds to the first target gray level value in the first gray level table, each original gray level combinations corresponds to one second target gray level value combination in the second gray level table, and the second target gray level value combination includes second target gray level values for the left eye and a second target gray level value for the right eye.

Wherein the device further includes a temporary storage for buffering one of the left eye image or the right eye image after the image is adjusted, sorting the buffered image and the other adjusted image, and transmitting the sorted left eye image and the right eye image.

Wherein the first adjusting unit further includes a first target determination sub-unit for searching the pre-defined first gray level table corresponding to the pixels and identifying the first target gray level value of the pixels; and a first target determination sub-unit for adjusting the gray level values of the pixels to be the first target gray level values.

Wherein the second adjusting unit further includes a second target determination sub-unit for searching the pre-defined second gray level table corresponding to the pixels and identifying the second target gray level value combination of the pixels; and a second adjusting sub-unit for adjusting the gray level values of the pixels to be the second target gray level values of the second target gray level value combination, and the second target gray level value combination includes the second target gray level value for the left eye and the second target gray level value for the right eye.

Wherein the first gray level table and the second gray level table satisfy the relationships below: a maximum brightness is obtained from a brightness of the left eye after overlapping the left eye and the right eye when the gray level combination for the left eye and the right eye is 255/0; a minimum brightness is obtained from a brightness of the left eye after overlapping the left eye and the right eye when the gray level combination for the left eye and the right eye is 0/255, and the maximum brightness corresponds to the gray level value equal to 255; the minimum brightness corresponds to the gray level value equal to 0 so as to form a three dimensional gray level gamma curve; the difference between the brightness of the second target gray level value of the second gray level table of the pixel after overlapping the left eye and the right eye and the brightness of the corresponding pixel on the three dimensional gray level gamma curve is within three percents; and the difference between the brightness of the first target gray level value of the first gray level table of the pixel after overlapping the left eye and the right eye and the brightness of the corresponding pixel on the three dimensional gray level gamma curve is within three percents.

BRIEF DESCRIPTION OF THE DRAWINGS

FIG. 5 is a schematic view of the second gray level table in accordance with one embodiment.

DETAILED DESCRIPTION OF THE EMBODIMENTS

Embodiments of the invention will now be described more fully hereinafter with reference to the accompanying drawings, in which embodiments of the invention are shown.

Figure 1:
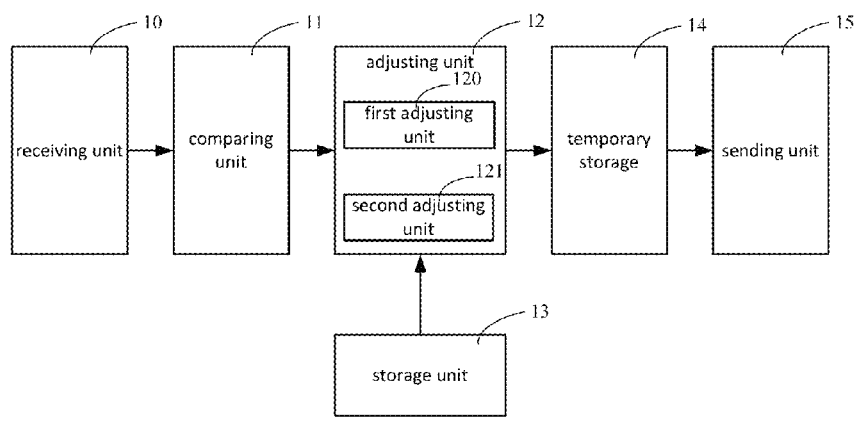
FIG. 1 is a schematic view of the device for reducing crosstalk of shutter-type 3D liquid crystal displays in accordance with one embodiment.

FIG. 1 is a schematic view of the device for reducing crosstalk of shutter-type 3D liquid crystal displays ("the device). The device is arranged within shutter-type 3D liquid crystal displays. Specifically, the device is arranged in the path between an original 3D signal input and a 3D signal output to the liquid crystal array display. The device may be implemented by a processing chip and corresponding circuits. As shown in FIG. 1, the device includes a receiving unit 10, a comparing unit 11, an adjusting unit 12, a first adjusting unit 120, a second adjusting unit 121, a storage unit 13, a temporary storage 14, and a sending unit 15.

The receiving unit 10 is for receiving digital information of an original left eye image and an original right eye image. The digital information includes original gray level values of all of the pixels of a current frame.

The comparing unit 11 is for determining if the gray level values of the pixels in each scanning lines of the left eye image are the same with that of a corresponding pixel in the right eye image.

The adjusting unit 12 is for adjusting the gray level values of the pixels of each scanning lines of the left eye image and the right eye image according to the comparing result of the comparing unit 11. Specifically, the first adjusting unit 120 adjusts the gray level values of the pixels of the left eye image and the right eye image when the comparing result of the comparing unit 11 is the same. The gray level values of the pixels are adjusted to be a first target gray level value of a first gray level table. The second adjusting unit 121 adjusts the gray level value of the pixels of the left eye image and the right eye image when the comparing result of the comparing unit 11 is not the same. The gray level values of the pixels are adjusted to be a second target gray level value combination of a second gray level table.

The temporary storage 14 is for buffering one of the left eye image or the right eye image after the above gray level value adjustments. Afterward, the temporary storage 14 sorts the buffered image and the other adjusted image.

The sending unit 15 is for transmitting the digital information of the sorted left eye image and the right eye image.

The storage unit 13 is for storing the corresponding first gray level tables and the second gray level tables of each scanning lines. Each original gray level values correspond to one first target gray level value in the first gray level table. Each original gray level combination corresponds to one second target gray level value combination in the second gray level table. The second target gray level value combination includes second target gray level values for the left eye and a second target gray level value for the right eye.

Figure 2:
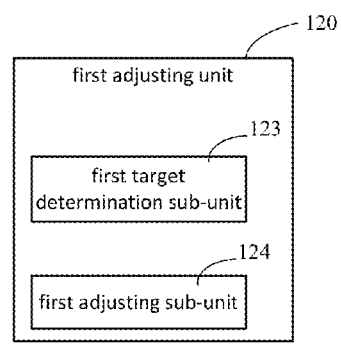
FIG. 2 is a schematic view of the first adjusting unit of FIG. 1.
Figures 3, 4:
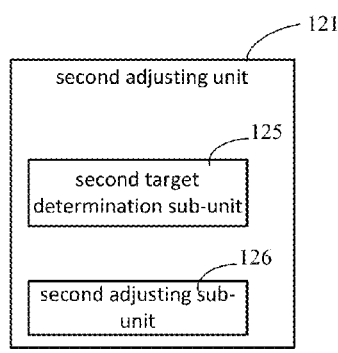
FIG. 3 is a schematic view of the second adjusting unit of FIG. 1.
FIG. 4 is a schematic view of the first gray level table in accordance with one embodiment.

Referring to FIGS. 2 and 3, the first adjusting unit 120 includes a first target determination sub-unit 123, and a first adjusting sub-unit 124. The first target determination sub-unit 123 is for searching the first gray level table corresponding to the pixels in the storage unit 13 if the gray level value of the pixels of each scanning lines of the left eye image is the same with that of the right eye image. The first target determination sub-unit 123 identifies the first target gray level value of the pixels in the first gray level table. The first target gray level value for the left eye is the same with that for the right eye.

The first adjusting sub-unit 124 is for adjusting the gray level values of the pixels to be the first target gray level values when the comparing result is the same.

The second adjusting unit 121 includes a second target determination sub-unit 125 and a second adjusting sub-unit 126. The second target determination sub-unit 125 is for searching the second gray level table corresponding to the pixel in the storage unit 13 if the gray level value of the pixels of each scanning lines of the left eye image is not the same with that of the right eye image. The second target determination sub-unit 125 identifies the second target gray level value combination of the pixels in the second gray level table. Each of the second target gray level value combination includes the second target gray level value for the left eye and the second target gray level value for the right eye.

The second adjusting sub-unit 126 is for adjusting the gray level values of the pixels to be the second target gray level values of the second target gray level value combination when the comparing result is not the same.

The first gray level table and the second gray level table are shown in FIGS. 4 and 5.

The corresponding first gray level table and the second gray level table for each scanning lines are stored in the storage unit 13 in advance. In one embodiment, the corresponding first gray level table and the second gray level table for different scanning lines are stored separately. In other embodiments, the scanning lines of the display may be divided to a plurality of areas. For example, five scanning lines are defined as in one area. The scanning line within the same area may adopt the same first gray level table and the second gray level table.

As shown in FIG. 4, each of the first gray level table stores the original gray level values and the corresponding first target gray level values. For example, if the original gray level values for the left eye image and right eye image are 255, the first target gray value is 249. If the original gray level values for the left eye image and right eye image are 253, the first target gray level value is 244. Similarly, the first target gray level values for other pixels in the scanning line may be identified by the first gray level table.

Referring to FIG. 5, each of the second gray level table stores the original gray level values and the corresponding second target gray level value combination. For example, if the combination of the original gray level values for the left eye image and right eye image are 255/1, the second target gray level value combination is 249/22. That is to say, the gray level value of the pixel of the left eye image is adjusted from 255 to 249, and the gray level value of the pixel of the right eye image is adjusted from 1 to 22. Similarly, the second target gray values for other pixels in the scanning line may be identified by the second gray level table.

It is to be noted that the first gray level table and the second gray level table satisfy the relationship below.

A maximum brightness is obtained from a brightness of the left eye after overlapping the left eye and the right eye when the gray level combination for the left eye and the right eye is 255/0. A minimum brightness is obtained from a brightness of the left eye after overlapping the left eye and the right eye when the gray level combination for the left eye and the right eye is 0/255. The maximum brightness corresponds to the gray level value equal to 255 and the minimum brightness corresponds to the gray level value equal to 0 so as to form a three dimensional gray level gamma curve. The difference between the brightness of the second target gray level value of the second gray level table of the pixel after overlapping the left eye and the right eye and the brightness of the corresponding pixel on the three dimensional gray level gamma curves is within three percents. The difference between the brightness of the first target gray level value of the first gray level table of the pixel after overlapping the left eye and the right eye and the brightness of the corresponding pixel on the three dimensional gray level gamma curve is within three percents.

It is to be understood that in the embodiment, the first gray level table and the second gray level table store the original gray level values and the corresponding target gray level value of the pixels of each scanning lines. In other embodiments, other formats may be adopted to store the above digital information.

Figure 6:
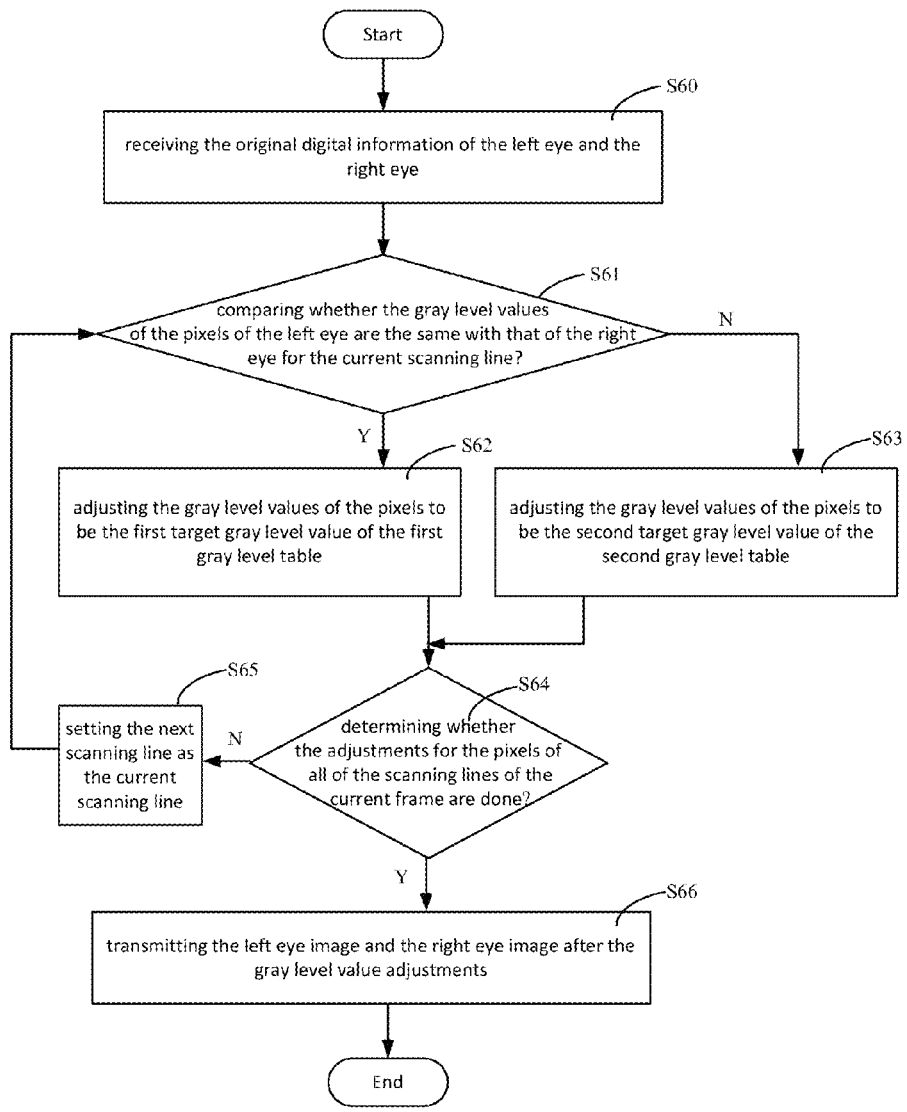
FIG. 6 is a flowchart illustrating the method for reducing crosstalk of shutter-type 3D liquid crystal displays in accordance with one embodiment.

FIG. 6 is a flowchart illustrating the method for reducing crosstalk of shutter-type 3D liquid crystal displays. The method includes the following steps. In step S60, the original digital information of the left eye and the right eye are received. The original digital information includes the gray level values of the pixels of the left eye and the right eye of the current frame.

In step S61, a comparison regarding whether the gray level values of the pixels of the left eye are the same with that of the right eye for the current scanning line is made.

If the comparing result in step S61 is the same, the process goes to step S62. If the comparing result in step S61 is not the same, the process goes to step S63 until the comparisons for all of the pixels of the current scanning line are made.

In step S62, the gray level values of the pixels are adjusted to be the first target gray level value of the first gray level table. The first gray level table of each scanning lines are pre-defined, and each of the original gray level values corresponds to one first target gray level value. Specifically, in this step, the first gray level values are identified by searching the corresponding first gray level table of the scanning line. Such adjustments are conducted for all of the pixels with the same gray level values for the left eye image and the right eye image.

In step S63, the gray level values of the pixels are adjusted according to the corresponding second gray level table of the scanning line. The gray level values of the left eye and the right eye of the pixels are adjusted to be the gray level values in the corresponding second target gray level value combination. The second gray level table of each scanning lines are pre-defined, and each of the original gray level value corresponds to one second target gray level value combination. In this step, the second gray level value combination is identified by searching the corresponding second gray level table. Each second target gray level value combination includes the second target gray level value for the left eye image and the second target gray level value for the right eye image. And the gray level values of the pixels of the left eye image are adjusted to be the second target gray level value for the left eye. The gray level values of the pixel of the right eye image are adjusted to be the second target gray level value for the right eye.

In step S64, the process determines whether the adjustments for the pixels of all of the scanning lines of the current frame are done.

If no, in step S65, the next scanning line is set as the current scanning line and the process goes to step S61.

In step S64, if the adjustments for the pixels of all of the scanning lines are done, in step S66, the digital information of the adjusted gray level value of the left eye image and the right eye image are transmitted.

Furthermore, in step S66, the left eye image and the right eye image are sorted to be in the sequence, and the sorted left eye image and the right eye image are transmitted.

It is to be noted that the first gray level table and the second gray level table of each scanning lines have to satisfy the relationship below.

A maximum brightness is obtained from a brightness of the left eye after overlapping the left eye and the right eye when the gray level combination for the left eye and the right eye is 255/0. A minimum brightness is obtained from a brightness of the left eye after overlapping the left eye and the right eye when the gray level combination for the left eye and the right eye is 0/255. The maximum brightness corresponds to the gray level value equal to 255 and the minimum brightness corresponds to the gray level value equal to 0 so as to form a three dimensional gray level gamma curve. The difference between the brightness of the second target gray level value of the second gray level table of the pixel after overlapping the left eye and the right eye and the brightness of the corresponding pixel on the three dimensional gray level gamma curve is within three percents. The difference between the brightness of the first target gray level value of the first gray level table of the pixel after overlapping the left eye and the right eye and the brightness of the corresponding pixel on the three dimensional gray level gamma curve is within three percents.

FIGS. 7A to 16 show one example of how to generate the corresponding first gray level table and the second gray level table of the scanning lines, and the relationship between the gray level tables and the scanning lines.

Figure 7A:
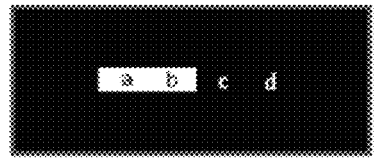
FIG. 7A is a schematic view showing the original view of the left eye.
Figure 8A:
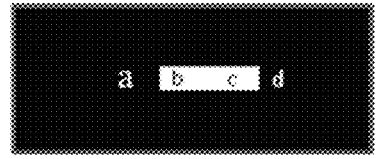
FIG. 8A is a schematic view showing the original view of the right eye.

FIGS. 7A and 8A show the original left eye image and right eye image received by the 3D liquid crystal displays. One of the scanning lines has four pixels including pixel A, B, C and D. The scanning line including the four pixels is taken as an example. In other embodiments, the scanning lines may include less than or more than four pixels. For pixel A, the gray level value for the left eye and the right eye are respectively 255 and 0. For pixel B, the gray level value for left eye and right eye are 255 and 255. For pixel C, the gray level value for the left eye and the right eye are respectively 0 and 255. For pixel A, the gray level value for the left eye and the right eye are respectively 0 and 0. As the gray values for the left eye and right eye of pixel A and C are different, the signal is specified as a three dimensional static signal. As the gray values for the left eye and right eye of pixel B and D are the same, the signal is specified as a two dimensional static signal.

Figure 7B:
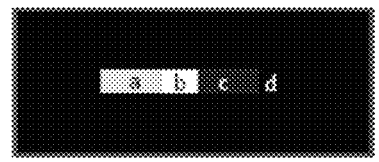
FIG. 7B is an effect diagram of FIG. 7A viewing from the left eye.
Figure 8B:
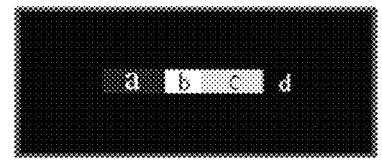
FIG. 8B is an effect diagram of FIG. 8A viewing from the right eye.

In flashing-type 3D liquid crystal displays with LED backlight, the crosstalk happens when the response time of the liquid crystal is not enough. FIGS. 7B and 8B are effects diagrams of FIGS. 7A and 7B. It can be seen that the brightness of pixels A and C of the left eye image is changed due to the crosstalk. That is, the brightness of pixels A and B are different due to the crosstalk. Similarly, the brightness of pixels C and D are also different due to crosstalk. In view of the three dimensional static diagrams of the left eye and right eye, the crosstalk happens when the original gray values of the pixels of the left eye image and right eye image are different. The crosstalk results in that the brightness for the brightest pixel and the darkest pixel are reduced. The crosstalk does not happen when the original gray values of the pixels of the left eye image and right eye image are the same. The pixels with the same gray level values for the left eye image and the right eye image are called as "three dimensional static signals," and the pixels with different gray level values for the left eye image and the right eye image are called as "two dimensional static signals." A brightness difference of the two dimensional static signals and the three dimensional static signals may be adapted to a brightness difference of the original images by adjusting the gray level values of the two dimensional static signals, or by adjusting the gray level values of the three dimensional static signals at the same time. The adjustment may be conducted by lowering the brightness of the brightest pixel, increasing the brightness of the darkest pixel, or adjusting the brightness of other pixels of the three dimensional static signals. In this way, the crosstalk may be eliminated or reduced.

It is found from the measurements that when the gray level value combination of the left eye image and the right eye image is 255/0, the brightness of the left eye is the maximum one. In addition, when the gray level value combination of the left eye image and the right eye image is 0/255, the brightness of the left eye is the minimum one. Thus, the maximum brightness and the minimum brightness are respectively obtained when the gray level value combination of the left eye image and the right eye image is 255/0 and 0/255. The maximum brightness and the minimum brightness are then used to generate a new three dimensional gray level brightness curve. As such, the crosstalk may be eliminated or reduced by adjusting the gray level value of the pixels to be adapted to the new three dimensional gray level brightness curve.

Figure 9:
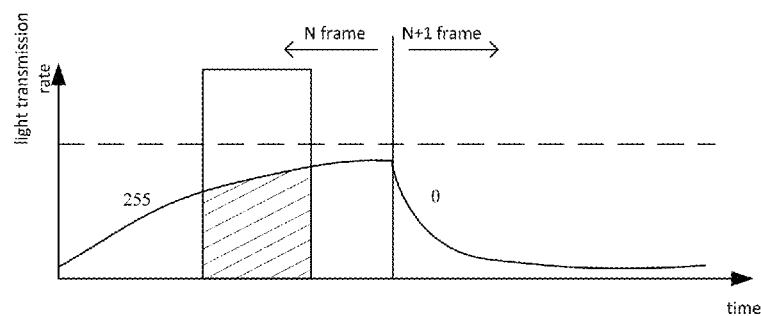
FIG. 9 is a curve diagram showing the relationship of the light transmission rate and the time after the left eye and right eye are overlapped in pixel A of FIG. 7A.

FIG. 9 is a curve diagram showing the relationship of the light transmission rate and the time after the left eye and right eye are overlapped in pixel A. The curve diagram is obtained by measuring the left eye of pixel A of FIG. 7B.

The rectangle of FIG. 9 indicates the time period for which the LED backlight is turn on. The shaded portion shows the brightness of pixel A for the left eye. It is to be understood that the time period, for which the LED backlight is turn on, is different for each of the scanning line. Therefore, the brightness of pixel A is different for different scanning line.

Figure 10:
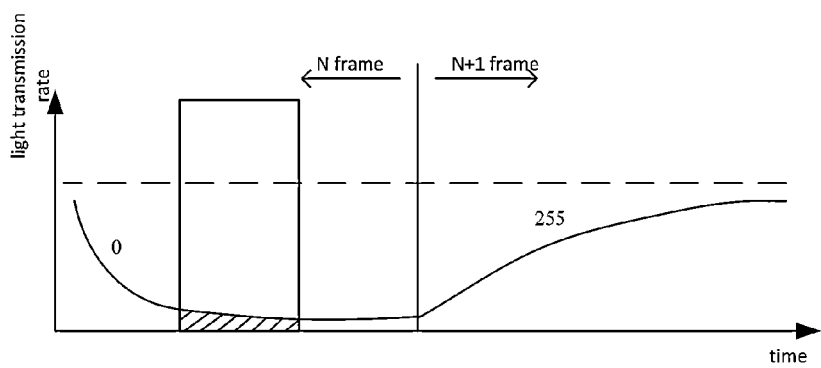
FIG. 10 is a curve diagram showing the relationship of the light transmission rate and the time after the left eye and right eye are overlapped in pixel C of FIG. 7A.

Similarly, FIG. 10 is a curve diagram showing the relationship of the light transmission rate and the time after the left eye and right eye are overlapped in pixel C. The curve diagram is obtained by measuring the left eye of pixel C of FIG. 7B. The rectangle of FIG. 10 indicates the time period for which the LED backlight is turn on. The shaded portion shows the brightness of pixel C for the left eye.

Figure 11:
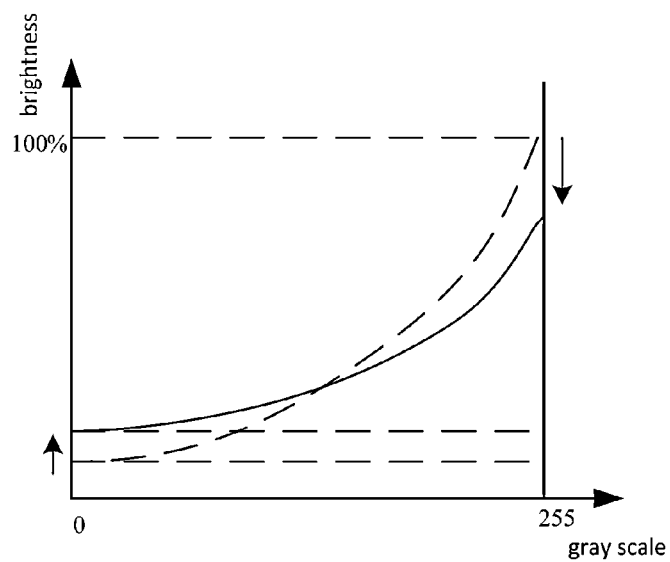
FIG. 11 is a diagram showing a new three dimensional gray level curve (gamma curve) according to FIGS. 9 and 10.

FIG. 11 is a curve diagram showing a new three dimensional gray level brightness of the current scanning line obtained from FIGS. 9 and 10.

The area of the shaded portion of FIG. 9 is taken as the maximum brightness, which corresponds to the gray level gray equal to 255, of the new three dimensional gray level brightness curve. The area of the shaded portion of FIG. 10 is taken as the minimum brightness, which corresponds to the gray level gray equal to zero, of the new three dimensional gray level brightness curve. As the brightness of the liquid crystal panel has a certain relationship with the gray level value, the new three dimensional gray level brightness curve may be obtained. In one embodiment, the brightness is equal to a constant coefficient multiplied by the gray level value raised to 2.2 power. As such, the maximum brightness and the minimum brightness may be obtained.

As shown in FIG. 11, the new three dimensional gray level brightness curve is shown by the solid line, and the gray level curve of the original images of the current scanning line is shown by the dotted line. It can be seen from the new three dimensional gray level brightness curve that the maximum brightness is reduced and the minimum brightness is increased.

The new three dimensional gray level brightness curve may be used to identify the first gray level table for the two dimensional static signals and the second gray level table for the three dimensional static signals.

Figure 12:
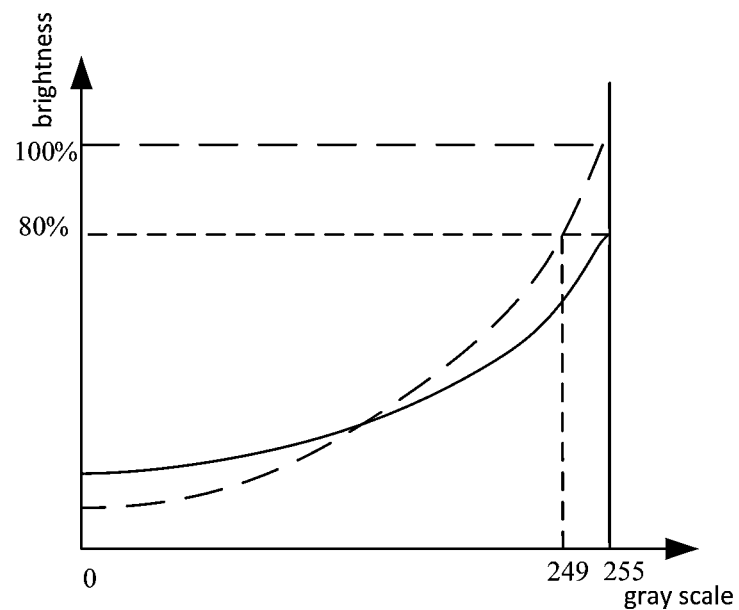
FIG. 12 is a schematic diagram showing that the two dimensional static signals are adjusted according to FIG. 11.

The gray level values of the two dimensional static signal are adjusted to conform to the new three dimensional gray level brightness curve. For the pixels with gray level values equal to 255, the gray level values have to be decreased to be 249 so as to conform to the new three dimensional gray level brightness curve, which substantially equals to 80 percents of the maximum brightness. Such mapping is also shown in FIG. 12.

Figure 13:
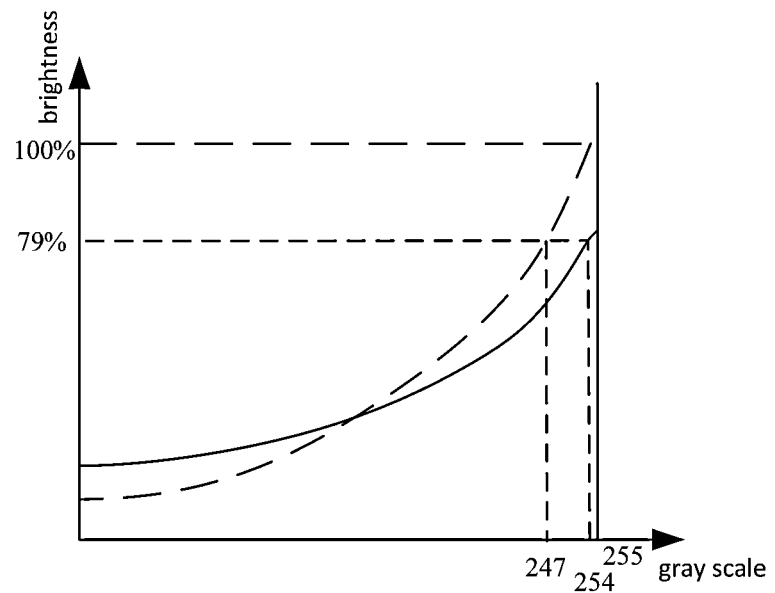
FIG. 13 is another schematic diagram showing that the two dimensional static signals are adjusted according to FIG. 11.

Similarly, different mapping relationships may be obtained as shown in FIG. 13. For example, as the gray level value combination of one pixel is 254/254, the gray level values of the combination have to be 247/247 so as to conform to the new three dimensional gray level brightness curve, which substantially equals to 79 percents of the maximum brightness.

The first gray level table may be obtained by adopting the above method. That is, the first target gray level value of the current scanning line of the two dimensional static signals may be obtained by the measurements. The first gray level tables are stored in the memory of the 3D liquid crystal device.

In other embodiments, the two dimensional static signal may be slightly different with the new three dimensional gray level brightness curve. For example, the difference between the two dimensional static signal and the new three dimensional gray level brightness curve may be within three percents.

Thus, the first gray level table of the current scanning line is not unique. If the first gray level table is stored in the storage unit 13, the first gray level table is adopted to adjust the two dimensional static signal.

Figure 7C:
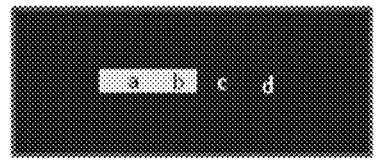
FIG. 7C is an effect diagram of FIG. 7A after the gray level brightness adjustment.
Figure 8C:
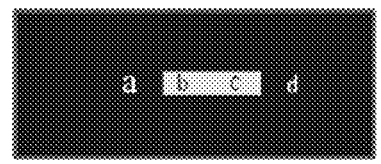
FIG. 8C is an effect diagram showing the image of FIG. 8A after the gray level brightness adjustment.

According to the mechanisms stated above, the gray level values of pixel B and pixel D of FIG. 7 are adjusted, i.e., the gray level value of pixel B is decreased and that of pixel D is increased. FIGS. 7C and 8C respectively show the effect diagrams of the left eye and the right eye. It can be seen that the crosstalk is reduced.

According to the mechanisms stated above, the new three dimensional gray level brightness curve and the second gray level table for different scanning lines may be obtained. The three dimensional static signals are adjusted according to the new three dimensional gray level brightness curve.

Figure 14:
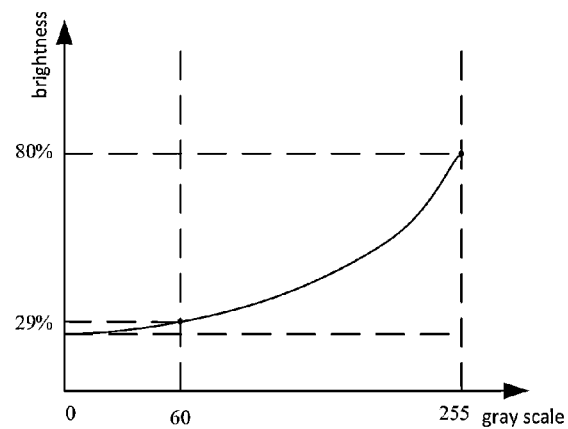
FIG. 14 is a schematic diagram showing that the three dimensional static signals are adjusted according to FIG. 11.
Figure 15:
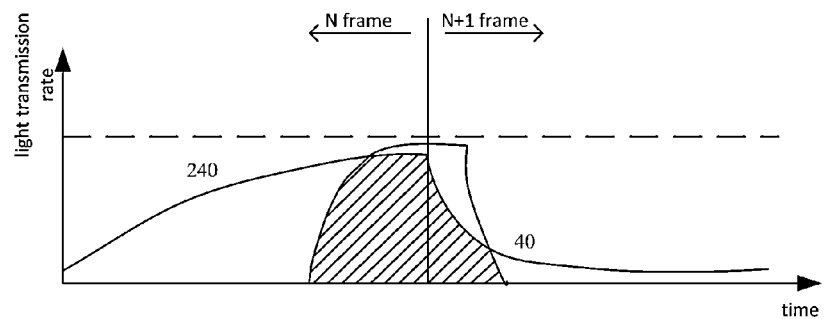
FIG. 15 is a curve diagram showing the relationship of the light transmission rate and the time after the three dimensional static signals of FIG. 14 are adjusted.
Figure 16:
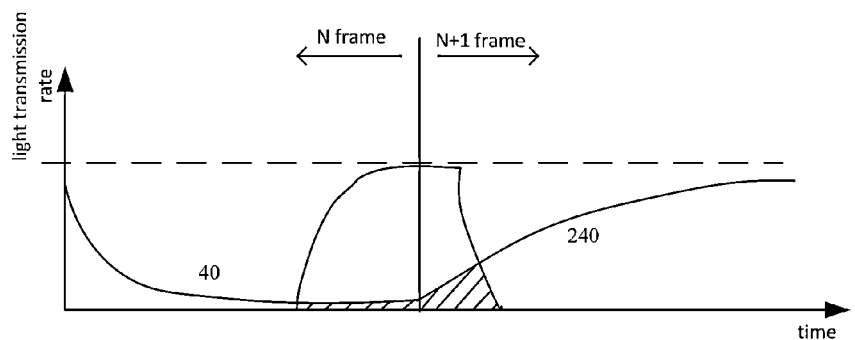
FIG. 16 is another curve diagram showing the relationship of the light transmission rate and the time after the three dimensional static signals of FIG. 14 are adjusted.

For example, when the gray level value combination of one pixel is 255/60, as shown in FIG. 14, the corresponding brightness of the new three dimensional gray level brightness curve is 80 percents and 29 percents. After conducting the measurement, the gray value combination conforms to the new three dimensional gray level brightness curve is 249/40. As shown in FIG. 15, the shaded portion corresponds to the maximum brightness. As shown in FIG. 16, the shaded portion corresponds to the minimum brightness. Thus, it can be seen that when the gray level value combination of one pixel is 255/60, the second target gray level value combination is 249/40.

Similarly, different mapping relationships for other three dimensional static signals may be obtained. For example, when the gray level value combination of one pixel is 254/50, the second target gray level value combination is 247/37.

The second gray level table may be obtained by adopting the above method. That is, the second target gray level value combination for the current scanning line may be obtained. The second gray level table is stored in the memory of the 3D liquid crystal device.

In other embodiments, the three dimensional static signals may be slightly different with the new three dimensional gray level brightness curve. For example, the difference between the two dimensional static signal and the new three dimensional gray level brightness curve may be within three percents.

Thus, the second gray level table of the current scanning line is not unique. If the second gray level table is stored in the storage unit 13, the second gray level table is adopted to adjust the two dimensional static signal.

In one embodiment, a shutter type 3D liquid crystal displays includes the device for reducing crosstalk of FIGS. 1 to 3. The operating mechanisms and details of the device are described with reference to FIGS. 1 to 16.

The above method includes obtaining the new three dimensional gray level brightness curve of each scanning lines, obtaining the corresponding first gray level tables and the corresponding second gray level tables of each scanning lines from the measurements in advance, and storing the first gray level tables and the second gray level tables in the 3D liquid crystal device. After receiving the original left and right eye images, the two dimensional static signal are adjusted according to the first gray level table, and the three dimensional static signal are adjusted according to the second gray level table so as to reduce the crosstalk.

The device and method disclosed in the above embodiments may reduce the crosstalk in the flashing-type 3D liquid crystal device or in the liquid crystal display with a long response time. As such, the cost for reducing the crosstalk of 3D liquid crystal device is also reduced.

It is believed that the present embodiments and their advantages will be understood from the foregoing description, and it; will be apparent that various changes may be made thereto without departing from the spirit and scope of the invention or sacrificing all of its material advantages, the examples hereinbefore described merely being preferred or exemplary embodiments of the invention.

What is claimed is:

1. A method for reducing crosstalk of a liquid crystal display, comprising:
    receiving digital information of an original left eye image and an original right eye image;
    determining if gray level values of pixels in each scanning lines of the left eye image is the same with that of a corresponding pixel in the right eye image;
    a first adjusting step for adjusting the gray level values of the pixels to be a first target gray level value of a first gray level table when the comparing result is the same;
    a second adjusting step for adjusting the gray level values of the pixels to be a second target gray level value combination of a second gray level table when the comparing result is not the same;
    transmitting the digital information of the left eye image and the right eye image after the first and second adjusting steps are executed for the pixels in all of the scanning lines;
    each of the gray level values of the first gray level table corresponds to one first target gray level values, each of the gray levels values of the second gray level table corresponds to one second target gray level value combinations, and the second target gray level value combination comprises the second target gray level value for the left eye image and the second target gray level value for the right eye image; and
    wherein the first gray level table and the second gray level table satisfy the relationships below:
    a maximum brightness is obtained from a brightness of the left eye image after overlapping the left eye image and the right eye image when the gray level value combination for the left eye image and the right eye image is 255/0;
    a minimum brightness is obtained from a brightness of the left eye image after overlapping the left eye image and the right eye image when the gray level value combination for the left eye image and the right eye image is 0/255, and the maximum brightness corresponds to the gray level value equal to 255;
    the minimum brightness corresponds to the gray level value equal to 0 so as to form a three dimensional gray level gamma curve; and
    a difference between the brightness of the second target gray level value of the second gray level table of the pixel after overlapping the left eye image and the right eye image and the brightness of the corresponding pixel on the three dimensional gray level gamma curve is within three percent; and
    a difference between the brightness of the first target gray level value of the first gray level table of the pixel after overlapping the left eye image and the right eye image and the brightness of the corresponding pixel on the three dimensional gray level gamma curve is within three percent.

2. The method as claimed in claim 1, wherein the first gray level table of each scanning lines are predefined.

3. The method as claimed in claim 2, wherein the second gray level table of each scanning lines are pre-defined.

4. The method as claimed in claim 3, wherein the second adjusting step further comprises:
    searching the pre-defined second gray level table corresponding to the pixels and identifying the second target gray level value combination of the pixels; and
    adjusting the gray level values of the pixels to be the second target gray level values of the second target gray level value combination.

5. The method as claimed in claim 2, wherein the first adjusting step further comprises:
    searching the pre-defined first gray level table corresponding to the pixels and identifying the first target gray level value of the pixels; and
    adjusting the gray level values of the pixels to be the first target gray level values.

6. The method as claimed in claim 1, wherein the transmitting step further comprises buffering one of the left eye image or the right eye image after the image is adjusted, sorting the buffered image and the other adjusted image, and transmitting the sorted left eye image and the right eye image.

7. A device for reducing crosstalk of a liquid crystal display, comprising:
   a receiving unit for receiving digital information of an original left eye image and an original right eye image;
   a comparing unit is for determining if gray level values of pixels in each scanning lines of the left eye image is the same with that of a corresponding pixel in the right eye image;
   a first adjusting unit for adjusting the gray level values of the pixels to be a first target gray level value of a first gray level table when the comparing result is the same;
   a second adjusting unit for adjusting the gray level values of the pixels to be a second target gray level value combination of a second gray level table when the comparing result is not the same;
   a sending unit for transmitting the digital information of the left eye image and the right eye image after the first and second adjusting steps are executed for the pixels in all of the scanning lines;
   each of the gray level values of the first gray level table corresponds to one first target gray level values, each of the gray levels values of the second gray level table corresponds to one second target gray level value combinations, and the second target gray level value combination comprises the second target gray level value for the left eye image and the second target gray level value for the right eye image; and
   wherein the first gray level table and the second gray level table satisfy the relationships below:
   a maximum brightness is obtained from a brightness of the left eye image after overlapping the left eye image and the right eye image when the gray level value combination for the left eye image and the right eye image is 255/0;
   a minimum brightness is obtained from a brightness of the left eye image after overlapping the left eye image and the right eye image when the gray level value combination for the left eye image and the right eye image is 0/255, and the maximum brightness corresponds to the gray level value equal to 255;
   the minimum brightness corresponds to the gray level value equal to 0 so as to form a three dimensional gray level gamma curve; and
   a difference between the brightness of the second target gray level value of the second gray level table of the pixel after overlapping the left eye image and the right eye image and the brightness of the corresponding pixel on the three dimensional gray level gamma curve is within three percent; and
   a difference between the brightness of the first target gray level value of the first gray level table of the pixel after overlapping the left eye image and the right eye image and the brightness of the corresponding pixel on the three dimensional gray level gamma curve is within three percent.

8. The device as claimed in claim 7, wherein the device further comprises a storage unit for storing the corresponding first gray level tables and the second gray level tables of each scanning lines.

9. The device as claimed in claim 8, wherein the device further comprises a temporary storage for buffering one of the left eye image or the right eye image after the image is adjusted, sorting the buffered image and the other adjusted image, and transmitting the sorted left eye image and the right eye image.

10. The device as claimed in claim 8, wherein the first adjusting unit further comprises:
    a first target determination sub-unit for searching the pre-defined first gray level table corresponding to the pixels and identifying the first target gray level value of the pixels; and
    a first adjusting sub-unit for adjusting the gray level values of the pixels to be the first target gray level values.

11. The device as claimed in claim 8, wherein the second adjusting unit further comprises:
    a second target determination sub-unit for searching the pre-defined second gray level table corresponding to the pixels and identifying the second target gray level value combination of the pixels; and
    a second adjusting sub-unit for adjusting the gray level values of the pixels to be the second target gray level values of the second target gray level value combination.

12. A liquid crystal display comprising a device for reducing crosstalk, the device comprising:
    a receiving unit for receiving digital information of an original left eye image and an original right eye image;
    a comparing unit is for determining if gray level values of pixels in each scanning lines of the left eye image is the same with that of a corresponding pixel in the right eye image;
    a first adjusting unit for adjusting the gray level values of the pixels to be a first target gray level value of a first gray level table when the comparing result is the same;
    a second adjusting unit for adjusting the gray level values of the pixels to be a second target gray level value combination of a second gray level table when the comparing result is not the same;
    a sending unit for transmitting the digital information of the left eye image and the right eye image after the first and second adjusting steps are executed for the pixels in all of the scanning lines;
    each of the gray level values of the first gray level table corresponds to one first target gray level values, each of the gray levels values of the second gray level table corresponds to one second target gray level value combinations, and the second target gray level value combination comprises the second target gray level value for the left eye image and the second target gray level value for the right eye image; and
    wherein the first gray level table and the second gray level table satisfy the relationships below:
    a maximum brightness is obtained from a brightness of the left eye image after overlapping the left eye image and the right eye image when the gray level value combination for the left eye image and the right eye image is 255/0;
    a minimum brightness is obtained from a brightness of the left eye image after overlapping the left eye image and the right eye image when the gray level value combination for the left eye image and the right eye image is 0/255, and the maximum brightness corresponds to the gray level value equal to 255;
    the minimum brightness corresponds to the gray level value equal to 0 so as to form a three dimensional gray level gamma curve; and
    a difference between the brightness of the second target gray level value of the second gray level table of the pixel after overlapping the left eye image and the right eye image and the brightness of the corresponding pixel on the three dimensional gray level gamma curve is within three percent; and a difference between the brightness of the first target gray level value of the first gray level table of the pixel after overlapping the left eye image and the right eye image and the brightness of the corresponding pixel on the three dimensional gray level gamma curve is within three percent.

13. The device as claimed in claim 12, wherein the device further comprises a storage unit for storing the corresponding first gray level tables and the second gray level tables of each scanning lines.

14. The device as claimed in claim 13, wherein the device further comprises a temporary storage for buffering one of the left eye image or the right eye image after the image is adjusted, sorting the buffered image and the other adjusted image, and transmitting the sorted left eye image and the right eye image.

15. The device as claimed in claim 13, wherein the first adjusting unit further comprises:

a first adjusting sub-unit for searching the pre-defined first gray level table corresponding to the pixels and identifying the first target gray level value of the pixels; and a first target determination sub-unit for adjusting the gray level values of the pixels to be the first target gray level values.

16. The device as claimed in claim 13, wherein the second adjusting unit further comprises:

a second target determination sub-unit for searching the pre-defined second gray level table corresponding to the pixels and identifying the second target gray level value combination of the pixels; and a second adjusting sub-unit for adjusting the gray level values of the pixels to be the second target gray level values of the second target gray level value combination.

* * * * *